Figures 1, 2:
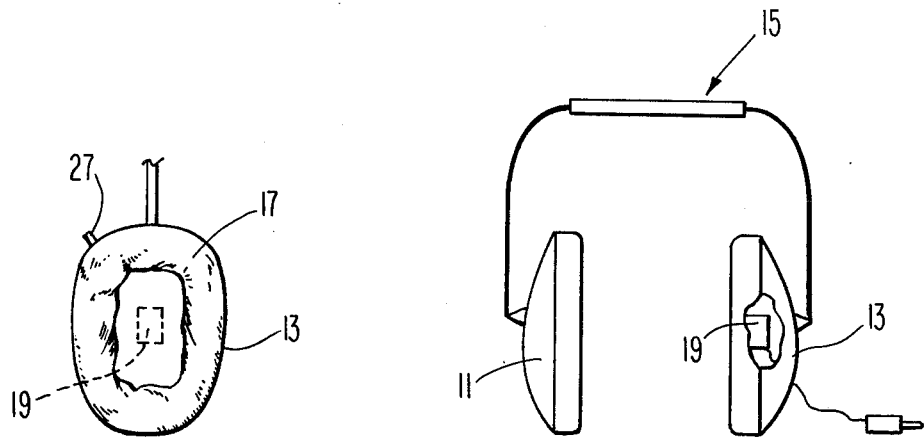

United States Patent [19]
Laessig

[11] 4,017,797
[45] Apr. 12, 1977

[54] HEADSET FOR RECEIVING AND TRANSMITTING SIGNALS

[75] Inventor: John D. Laessig, Newtown Square, Pa.

[73] Assignee: Columbia Research Laboratories, Inc., Woodlyn, Pa.

[22] Filed: Feb. 5, 1975

[21] Appl. No.: 547,184

[52] U.S. Cl. .......................... 325/16; 179/107 BC; 179/156 R

[51] Int. Cl.² ...................... H04B 1/44; H04M 1/05

[58] Field of Search ......... 179/1 P, 107 BC, 107 E, 179/156 R, 102, 167; 325/16, 21, 361; 343/175, 180

[56] References Cited
UNITED STATES PATENTS

| | | | |
|---|---|---|---|
| 1,525,182 | 2/1925 | Hayes | 179/102 |
| 3,087,028 | 4/1963 | Bonnin | 179/156 R |
| 3,683,130 | 8/1972 | Kahn | 179/156 R |
| 3,862,379 | 1/1975 | Pless | 179/167 |
| 3,908,095 | 9/1975 | Jinsenji | 179/102 |

*Primary Examiner*—Robert L. Griffin
*Assistant Examiner*—Marc E. Bookbinder
*Attorney, Agent, or Firm*—William E. Cleaver

[57] ABSTRACT

The present invention provides a two-way sound transducer system, including amplification circuitry within an ear-muff type attenuator, to enable the user to listen to principally voice communications (although other forms of sound can be transmitted) from a remote location and in response thereto answer a communication by talking in a natural voice, irrespective of the total surrounding noise present at the location of the user.

6 Claims, 3 Drawing Figures

U.S. Patent April 12, 1977 4,017,797

HEADSET FOR RECEIVING AND TRANSMITTING SIGNALS

BACKGROUND

Early in the history of military and commercial aviation, it was determined that ground personnel, who were directing an aeroplane to a parking position on the "apron," were subjected to noise which was not only injurious to the ears but which made communication, except by sign language, virtually impossible. Accordingly, there were developed earmuff type noise attenuators which were designed to fit over the user's ears so that he could block out the noise of the aircraft engines while directing the aircraft to a parking position. Thereafter it became apparent that it would be useful to have some method of voice communication with the ground personnel rather than having to rely on sign language. Various devices were developed, such as equipment which included an ear piece inserted into the ear of the "parking" person with an earmuff type attenuator fitted thereover. This equipment enabled the ground personnel to hear questions or comments from the pilot or other sources of inquiry while at the same time keeping the surrounding noise from interfering with his hearing. In order for the ground personnel to "talk back" to the pilot (or others) a mouth piece element was later developed and is presently generally employed. The mouthpiece element is strapped across the mouth of the user so that he can reply to the communications received by his ear speaker piece. While these arrangements have been useful, and indeed an improvement over using sign language, they have lacked desirability in that they have been uncomfortable to use. The earpiece in the ear, which is similar to a hearing aid device, has been uncomfortable to wear for any length of time and the mouth piece strapped across the mouth was and is not only uncomfortable, but with certain individuals, interferes with their breathing. In addition, it has sometimes been the practice to have several persons use the same headgear and the serial use of the mouthpiece presents a health hazard. The present invention provides a means to permit the user to wear earmuff type devices to effect sound attenuation, as related to the surrounding sound which is attempting to enter the auditory canals of the ears of the user, and in addition, the present invention provides a means for receiving and transmitting communication signals without an earpiece in the ear or using a mouthpiece strapped across the user's mouth. While the problem has been exemplified by reference to the aviation industry, it should be understood that the problem is common to many industrial plants, construction sites, fire and riot situations, and all other high level noise environments, where communications between persons is desirable.

SUMMARY

The present device provides an earmuff housing, as part of a pair of earmuffs, within which there is located a miniaturized microphone which is connected to a miniaturized amplification circuit. The microphone receives energy which is propogated from the voice box (larynx) of the user to the user's ear via the auditory canal by virtue of the face bones and/or other parts of the user's head. The microphone or transducer translates the sonic energy into electrical signals which are amplified with virtually no line transmission between the transducer and the amplifier. This immediate amplification; i.e., the virtual nonexistence of line transmission, makes it possible to ultimately use amplified signals from the microphone or transducer for further amplification, or ohmic transmission to a remote location or transmission by radio waves to a remote location. The receiver-transmitter circuit includes a transducer which is connected between transmitting and receiving terminals as required. Electrical signals are received by the transducer when it is in the receiving mode of operation and the transducer in response translates these electrical signals into sonic energy. The sonic energy is transmitted to the ears (of the user) to provide intelligence signals. The circuit employed with the transducer includes a switch which, when depressed, disconnects the transducer from the receive terminal and connects it to the transmit terminal of the jack through an integrated circuit amplification network. The sonic energy received by the transducer from the voice box when the user is talking in a natural tone, is translated into weak electrical signals which are amplified by the integrated circuit amplifier network. After the signals are amplified they are suitable for transmission over long distances for use at a remote location.

Figure 3:
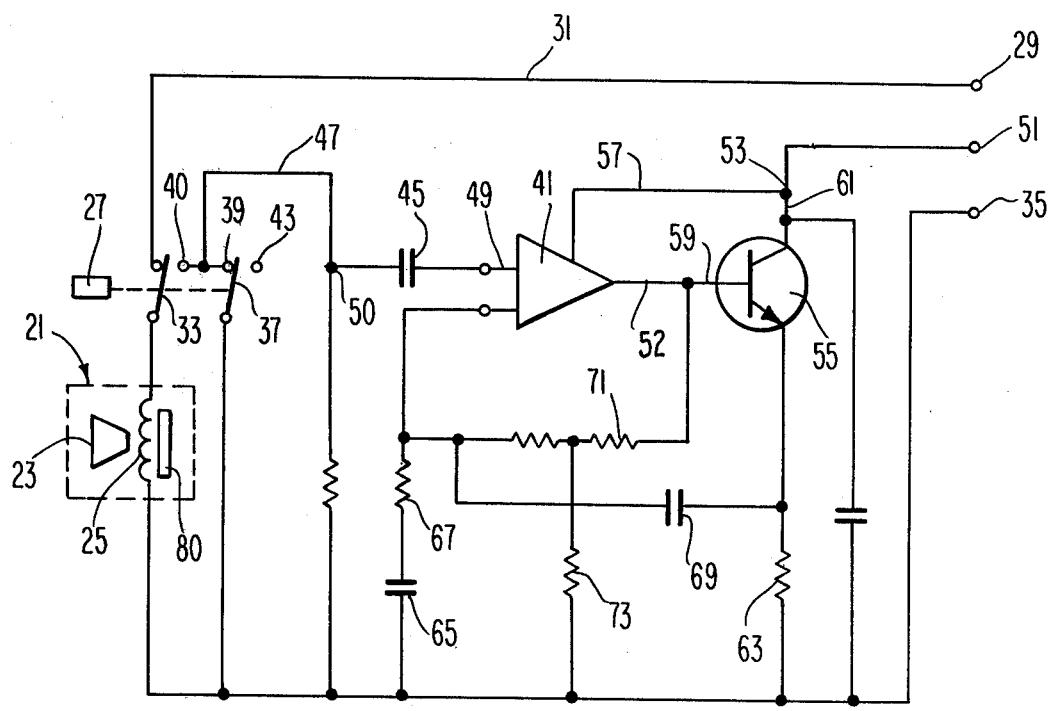

The features and objects of the present invention will be better understood from a study of the following description taken in conjunction with the drawings, wherein:

FIG. 1 is a schematic pictorial showing a pair of earmuff devices with one earmuff device having the transducer amplifier circuit located therein; and FIG. 2 is a side view of the earmuff device having the transducer-amplifier circuit located therein; and FIG. 3 is a schematic diagram of the amplifier circuit used in conjunction with the transducer.

Consider FIG. 1. In FIG. 1, we find a pair of earmuff type attenuators 11 and 13 secured to a spring holder 15 which fits over the user's head. The spring holder fits over the head thereby locating the earmuff type attenuators 11 and 13 over the ears of the user. The inside of the earmuff has a soft material such as foam plastic secured thereto so that the pressure of the spring frame 15 does not cause the earmuff device to "dig into" the head portion which surrounds the ear of the user. In FIG. 2 foam plastic material 17 is shown secured to the earmuff device 13.

In FIG. 1 the earmuff device 13 is broken away to show schematically that the transducer and the miniaturized amplification circuitry (identified as circuitry 19) is located within the earmuff device 13. The circuitry 19 is shown in detail in FIG. 3.

Now it should be understood that in the preferred embodiment, the transducer is similar to an AJ 1440 transducer which is manufactured by the Knowles Electronics Co., Inc., Franklin Park, Ill. The transducer can be a microphone provided it has the ability to act as a loudspeaker also. Other types of transducers can be used. In the preferred embodiment the rectangular transducer has dimensions of 0.904 by 0.625 by 0.313 inches, or 2.30 by 1.59 by 0.796 centimeters. Consider now FIG. 3 which shows the schematic diagram of the amplifier network which is employed in the present invention.

In FIG. 3 there is shown schematically a transducer 21. The transducer 21 is made up of a diaphragm 23 which is coupled to a coil 25. Actually the coil 25 is wound on a magnet 80 although other coil and magnet arrangements can be used. When electrical signals are received by the coil 25 it causes the diaphragm to move, thereby causing the diaphragm to generate sonic energy waves which are identified as sound to the human ear. Also shown in FIG. 3 is a switch device 27 which is shown in its normal position. The switch 27 is physically located on the housing 13 as shown in FIG. 2. When the switch device 27 is connected as shown there is a circuit from the tip terminal 29, through the wire 31, through the transfer strap 33 of the switch 27, through the coil 25 of the transducer 21 back to the shell terminal 35. The circuit just described is the receiving circuit. When there is a communication from the pilot, or some other source which is communicating to the person wearing the earmuffs, the electrical signals representing the voice communication are transmitted from the tip 29, along the line 31, through the transfer strap 33, through the coil 25 and along the return line to the shell terminal 35. Meantime, of course, the electrical energy in the coil 25 creates a magnetic field which causes the diaphragm 23 to be moved thereby creating the sound waves which are transmitted to the ear drum of the user.

It should be noted that the transfer strap 37 is connected to the point 39 when the circuit is in the "receive" condition. This, of course, provides a short circuit for the capacitance coupled input of the operation amplifier 41. By short circuiting the capacitance coupled input of the amplifier 41, any noise which may be present at the amplifier input, while the circuit is in the receiving mode, is eliminated or grounded.

Now when the user has received the communication, using the circuit in the receiver mode, as just described, and in response wants to reply, he simply depresses the switch 27. When the switch 27 is depressed, the transfer strap 33 is transferred to the terminal 40 and at the same time the transfer strap 37 is transferred to the dummy terminal 43. The transfer of the transfer strap 37 to the dummy terminal 43 merely disconnects the short circuit as previously described. On the other hand, the transfer of the transfer strap 33 to terminal 40 provides an input circuit to the capacitor 45 which is the capacitance coupled input to the amplifier 41.

Accordingly when the user is going to "talk back" to the person who originally communicated with him, he depresses the switch 27 and commences talking in a very normal tone of voice. If at that time the engines of the aircraft (or other sources of high level noise are present) are in operation, there is very little chance that his voice will be heard as it emanates from his mouth. On the other hand, the sound signals from the user's voice box or larynx are omni-directional and are propogated through the head bones and through the auditory canal to strike the diaphragm 23. It follows that the striking of the diaphragm 23 by sonic energy waves causes it to vibrate thereby moving the coil 25 and inducing small signals therein as it moves in the field of its associated magnet 80. These small signals are transmitted from the coil 25, through the transfer strap 33, through the terminal 40, along the jumper wire 47, to the terminal 50 and on through the capacitor 45 to the amplifier 41. In the preferred embodiment the distance from the microphone to amplifier is approximately 1.5 inches or 3.81 centimeters, although it can be made shorter to enhance the advantages of the present invention.

Now the amplifier 41 is a high-gain, low noise amplifier. In the preferred embodiment the amplifier is similar to an LM-381 Model amplifier manufactured by the National Semiconductor Company. Other amplifiers may be used but they should be amplifiers which have a low internal noise factor while at the same time have a high gain. In particular, the amplifier used has an open loop gain of greater than 50,000 and it is usually run at a gain of 1,000 to 5,000 to provide stability to the circuit. The gain is reduced by the feedback feature of the amplifier.

In operation, the signals from the microphone are in the range of 2 to 10 millivolts. This signal is accepted through the capacitor 45 to the upper input terminal 49 of the amplifier 41. The amplifier 41 amplifies the signal so that the output signal on line 52 is approximately 5 to 10 volts. Now the ring tip 51 is connected to an electrical current source which supplies 20 milliamps to the terminal 53 and on to external circuits. The transistor 55 is biased for partial conduction even when amplifier 41 is not conducting. The partial conduction enables the output signal to swing above and below the bias level for Class A operation. If, of course, the user is speaking and there are electrical signals transmitted through the capacitor 45 to the input terminal 49, the output signal on line 50 will be provided to the base 59 of the transistor 55. The transistor 55 is an NPN transistor and conducts more or less in response to the input signals to the base 59. When the transistor 55 conducts in response to the output of the amplifier 41 there is signal current transmitted along the line 61 and therefore there is a signal detectable at the ring terminal 51. The electrical current which is transmitted through the tranistor 55, passes through the resistor 63, back to the other side of the line at the shell terminal 35.

Since the input signals to the transducer 21 are so small, it is imperative that the circuit develop a high signal to noise ratio in order that these small signals can be usable to provide intelligence at the output; i.e., at the ring terminal. Now in order to provide a circuit which is not susceptible to noise, the circuit should be characterized by a low impedance and a high voltage. By locating the amplifier exceedingly close to the microphone and by using a high gain amplifier with a low impedance output, the transmission circuit ends up with the characteristics of being low impedance and providing a high voltage signal therefrom. Accordingly the circuit is not very susceptible to noise interferences. On the other hand, by comparison, prior art circuits have used relatively long wire leads from the microphone or ear piece to the amplifier, and this represents a high impedance condition with low voltage signals making the circuit very susceptible to noise interference.

In addition, the present circuit is designed to have a flat response in the frequency range between 200 hertz and 3500 hertz. The flat response is accomplished by first providing a low pass filter composed of the capacitor 65 and the resistor 67, and secondly by providing a high pass filter made up of the capacitor 69 and the resistor 63. In addition, for stabilization, the d.c. operating level of the amplifier 41 is determined by providing the resistor network composed of the resistor 71 and the resistor 73.

The present instrumentality including the circuit just described makes what was heretofore a highly desirable concept into an actual usable device. It has been proposed hereinbefore that a transducer could be used in the ear, both to receive and transmit, but in fact the implementation thereof has not been accomplished because the designs of such a prior art device located the amplifier some distance away from the microphone and therefore the circuit took on the characteristics of a high impedance-low voltage transmission. This type of circuitry proved to be very susceptible to noise and the result was that the communication was impossible, or at the very best, unsatisfactory. The present circuit on the other hand provides not only the microphone in the ear muff housing, but also the amplification circuitry physically located close at hand to the transducer. Accordingly, there is not a long transmission line and not a high impedance, and the circuit becomes immediately a high voltage-low impedance circuit with a carefully designed flat response in the range of the audio frequencies.

I claim:

1. A device for attenuating ambient sounds attempting to enter the auditory canals of the ears of a user and for transmitting and receiving audio signals to and from at least one ear of the user which audio signals provide a basis of communication with a remote site comprising in combination: first and second sound attenuating members, said sound attenuating members each formed to surround a different one of the ears of said user and further formed to attenuate ambient sounds attempting to enter the auditory canal of its associated ear; securing means coupled to said first and second attenuating members and formed to secure said sound attenuating members over the ears of said user; a unitary, sound signal transducer means disposed in said first sound attenuating member so as to avoid coming in direct contact with the user's head and formed and disposed in said first sound attenuating member to receive sound signals generated by the larynx of said user and emanating from the auditory canal of the ear, of said user, surrounded by said first sound attenuating member in order to generate first electrical signals in response to said received sound signals, said unitary, sound signal transducer further formed and disposed to receive second electrical signals from a remote location and generate audio signals in response to said second electrical signals to be transmitted to the eardrums of said user; switching means located less than 1.5 inches from and connected to said unitary sound signal transducer means, said switching means formed to provide a first signal path or said first electrical signals generated by said unitary, sound signal transducer means and to provide a second signal path for said second electrical signals; high gain amplification circuitry means disposed in said first sound attenuating member less than 1.5 inches from said switching means and 1.5 inches or less from said unitary sound signal transducer means and connected to said first signal path whereby the circuit, from said unitary, sound signal transducer means, including said first signal path and said amplification circuitry is characterized by being a high gain-low noise circuit; and circuitry means connected to said high gain amplification means and adapted to transmit amplified electrical signals therefrom to a remote location.

2. A device according to claim 1 wherein each of said sound attenuating means is formed like an earmuff and includes foam plastic to come in contact with its associated ear.

3. A device according to claim 1 wherein said securing means is a spring loaded means formed to fit over the head of the user and formed to force said sound attenuating members toward each other.

4. A device according to claim 1 wherein said sound signal transducer includes a diaphragm coupled to a coil which is wrapped on an associated magnet.

5. A device according to claim 1 wherein there is further included a low-pass filter and a high-pass filter connected to said amplification circuitry means to provide a flat response in the audio frequency range of signals.

6. A device according to claim 1 wherein there is further provided a resistor network to said amplificaion circuitry to provide a stabilized d.c. operating level therefor.

* * * * *